Nov. 30, 1954  F S. PORTER  2,695,466
TOWING HITCH FOR DITCH DIGGING AND BANK FORMING IMPLEMENTS
Filed March 1, 1951  2 Sheets-Sheet 2
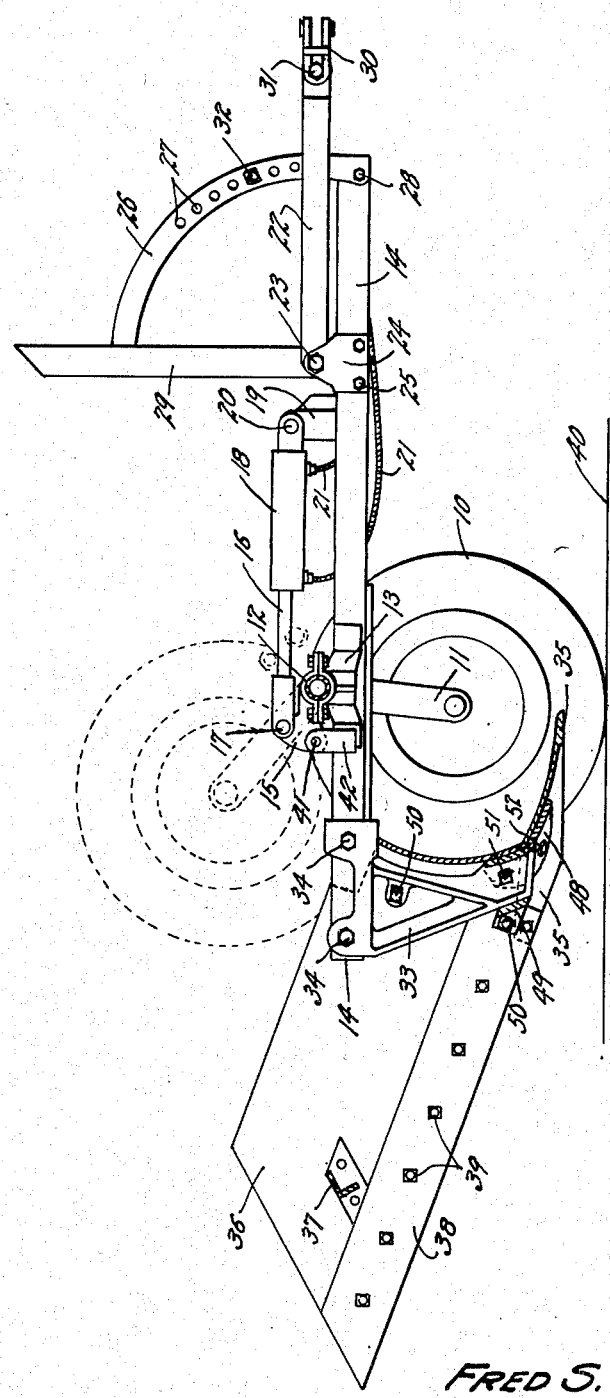
INVENTOR.
FRED S. PORTER
BY
ATTORNEY

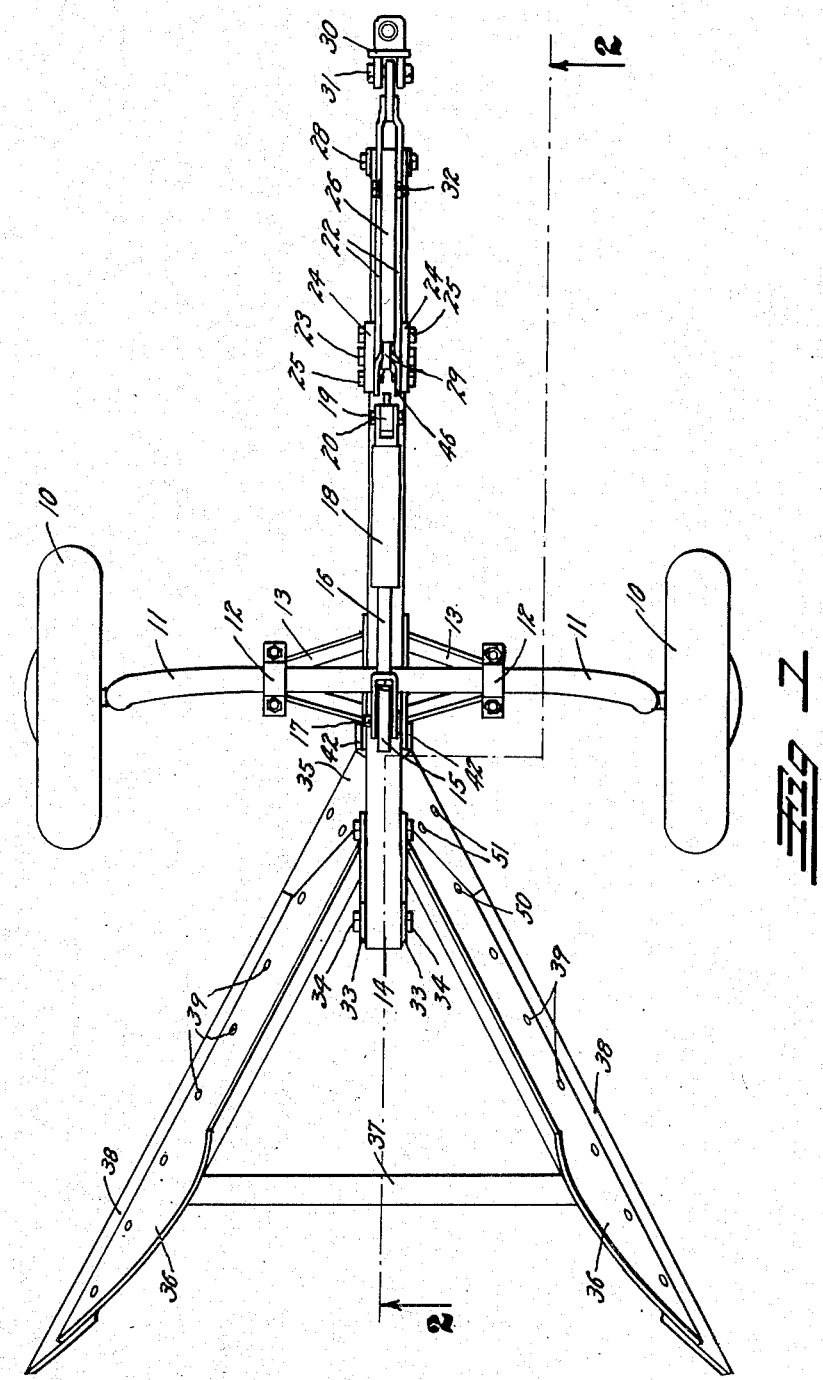

United States Patent Office 2,695,466
Patented Nov. 30, 1954

2,695,466

TOWING HITCH FOR DITCH DIGGING AND BANK FORMING IMPLEMENTS

Fred S. Porter, Taber, Alberta, Canada

Application March 1, 1951, Serial No. 213,336

1 Claim. (Cl. 37—98)

This invention relates to a towing hitch for a ditch digging and ditch bank forming implement of the type employing an inclined V-shaped plow, the point of which forms the bottom of a ditch and the flaring sides of which form the sides and banks of the ditch. In plows of this type the width of the ditch, due to the V-shape of the plow, is proportionate to the depth being plowed. The principal object of the present invention is to provide a simple and highly efficient towing hitch for a ditch-digging and bank-forming implement of this character which can be preset to limit the upward movement of the plow to any desired arc so as to control the width and depth of the ditch being formed by the implement.

Another object is to provide an implement of this character in which the digging plow share and the supporting wheels will be in transverse alignment so that lateral ditches may be dug into or away from a main ditch without disturbing the opposite bank of the latter, and to so construct the device that the depth of plowing can be easily, accurately, and hydraulically controlled by the driver of the towing vehicle while the machine is in motion.

A further object is to so construct the device that the digging plow share can ride over sub-surface rocks, etc., without damage to the implement and with a minimum disturbance of the digging project.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawings:

Fig. 1 is a plan view of the improved ditch digging and bank building implement; and Fig. 2 is a longitudinal section therethrough, taken on the line 2—2, Fig. 1.

The improved ditch digging and bank building implement is mounted on ground-engaging wheels 10 journalled on the extremities of a tubular crank axle 11. The crank axle is rotatably mounted in bearing sleeves 12 supported in a frame 13. The frame 13 is secured to and supports a medial, longitudinally extending frame beam 14.

A segment-shaped actuating lever 15 is welded or otherwise secured to the middle of the axle 11 so as to rotate therewith. A hydraulic plunger 16 is connected by means of a crank pin 17 with the actuating lever 15 and extends into a hydraulic cylinder 18. The cylinder 18 is pivoted to a bracket member 19 upon a suitable hinge pin 20. The bracket member 19 is welded or otherwise fixedly secured on the upper face of the beam 14 adjacent its forward extremity. Suitable hydraulic hoses 21 convey hydraulic fluid to and from the cylinder 18 from any suitable source on the towing vehicle (not shown).

A bifurcated draft bar 22 having two parallel legs extends forwardly from the beam 14. The rear extremities of the legs of the draft bar terminate in hinge bolts 23 extending through side bracket members 24. The side bracket members are secured to opposite sides of the beam 14 adjacent its forward extremity in any desired manner, such as by means of attachment bolts 25.

The two legs of the bifurcated draft bar 22 extend on opposite sides of an arcuate sector bar 26 provided with a series of spaced-apart bolt holes 27. The sector bar extends from an attachment bolt 28 in the beam 14 to an upright post 29 welded or otherwise secured to the top of the beam. The forward extremity of the draft bar 22 is connected to a draw bar attachment clip 30 by means of a draw bar bolt 31. The clip 30 is designed to be attached to the draw bar of the towing tractor so as to swing in a horizontal plane. The bolt 31 allows movement in a vertical plane so that a universal attachment is provided. A stop bolt 32 may be placed in any desired one of the bolt holes 27.

The rear extremity of the beam 14 carries a plow share casting 33 secured thereto by means of attachment bolts 34. An attachment pad 48 is secured to the lower extremity of the casting 33 by means of bolts 51, or in any other desired manner. The pad 48 supports a two-way plow share 35 at its lower extremity attached by bolts 52. The point of the share 35 is positioned substantially at and below the axes of the wheels 10 when the latter are in the lowered position.

Two earth-turning mold boards 36 are secured to the casting 33 by means of bolts 50 and extend from opposite sides thereof, there being a cross beam 37 extending between the mold boards to maintain them in rigid, preset, V-shaped arrangement. The mold boards are preferably 18" wide and are curvated on a radius of approximately 16" throughout their lengths. The lower edges of the boards 36 are reinforced by means of longitudinally extending wear plates 38 secured thereto by means of spaced-apart bolts 39.

When the plunger 16 is in its fully extended position, as shown in Fig. 2, the tubular crank axle 11 extends almost vertically downward, with a slight incline toward the rear so that gravity tends to pull the beam 14 downwardly. This downward pull is resisted by the hydraulic fluid in the cylinder 18. By allowing this fluid to discharge, the frame beam 14 and the share 35 can be lowered to any desired position. The wheels 10 can be swung upwardly to the broken line position of Fig. 2 by actuation of the hydraulic cylinder 18 so that the entire weight of the entire device may rest upon the share 35.

In Fig. 2 the wheels 10 are illustrated in the transportation position, with the share 35 elevated completely above the surface of the ground, indicated by the line 40. The wheels 10 may be locked in this position by passing a suitable locking pin through aligned openings 41 in two locking ears 42 and through a corresponding opening in the actuating lever 15, so that the device will be supported for transportation, even though disconnected from a source of hydraulic pressure.

Operation

Let us assume that the device is connected with the draw bar of a tractor through the medium of the draw bar clip 30, and that the stop bolt 32 has been positioned in one of the holes 27, as indicated in Fig. 2. The hydraulic device is now actuated to lift the wheels sufficiently to allow the plow share 35 to descend a selected depth below the ground line 40.

The towing vehicle is now started, causing the share to dig into the ground. The resistance to the share results in a downward movement on the forward extremity of the beam 14, causing it to tilt downwardly until the stop bolt 32 engages the draft bar 22. This tilts the rear extremities of the mold boards 36 upwardly to produce a ditch of the desired width. It will be noted that a limited-arc rotating hitch is provided with the pivot point of the ditcher at the axis of the hinge bolt 23. It will also be noted that this pivot point moves further downward as the stop bolt 32 is raised. It will therefore move downward to a position on the natural line of draft between the plow share and the draw bar attachment clip 30 to facilitate easy operation and create a minimum of draft. The operator can control the depth of the ditch by the setting of the wheels 10, and can control the width of the ditch by changing the position of the bolt, for the higher the bolt is set the greater will be the vertical angle of the mold boards. With the mold boards approaching horizontal, the greater will be the width of the ditch, and with the mold board approaching a vertical position, the narrower will be the width of the ditch.

The digging implement is tail-heavy due to the weight of the casting 33 and the mold boards 36. Therefore, as soon as the share is lifted from the ground, gravity will bring the beam 14 to the horizontal trailing position of Fig. 2. Therefore, the operator need not leave his driving position to bring the draw bar to the proper digging and trailing positions.

The limited rotating hitch allows for certain fluctuation so that the machine may follow the contour of the ground, thus digging up sufficient dirt in the low places to build good banks, instead of bridging over the depressions and leaving low places in the ditch banks. In case the share rides over a rock, the rotating hitch will allow the front end of the beam to rise automatically and go over the rock, but immediately the rock is passed the beam will drop down to the extreme digging position so that the rock will do a minimum of damage to the digging operation.

The object of the digger is two-fold; to dig a ditch and to build two banks. The main object of the digging is to obtain dirt to build the banks, and the object of the banks is to make it possible to hold the water above the ground in sufficient quantities to run onto the land.

The curve in the mold boards and the angle of the boards with each other and with the ground surface are all designed to build strong, water-tight banks. The large radius of curve in the boards gives a slow turn to the sod, so that it will be turned over only once and will lie flat on the ground. The incline of the wear plates 38 prevents them from scouring, so that they will drag pulverized earth along the roll of sod to fill the cracks and holes therein to produce a water-tight bank.

Since the wheels are mounted on the beam at a point vertically above the leading edge of the share, the wheel support is substantially opposite the point of the share. Thus, when the machine is crossing an obstacle, such as a ditch or railroad track, the share will be raised over the object with the wheels to prevent the share from striking the object. This structure also causes the machine to follow the contour of the ground very closely.

It will be noted that the rear extremities of the mold boards project laterally beyond the paths of the wheels so that the ditch may be formed closely adjacent to a fence or other obstacle.

It will also be noted that, since the share is located between the wheels, it is possible to dig a new ditch directly from an old ditch by backing the machine over into the old ditch, lowering the ditcher into the ground, and going ahead.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A towing hitch for controlling the width of a ditch formed by a ditch digging and bank forming implement of the type having a medial, longitudinally extending frame beam tiltably supported on ground engaging wheels and supporting an inclined, V-shaped ditch forming plow rearwardly of said wheels comprising: side bracket members secured to the sides of said beam and projecting upwardly therefrom adjacent the forward extremity thereof; a hinge bolt extending between said bracket members above and transversally of said beam; a bifurcated draft bar having two parallel legs hingedly mounted at the rear extremities on said hinge bolt and adapted to extend forwardly over and project forwardly from said beam; a tractor attachment device hingedly mounted on the forward extremity of said draft bar so as to swing in a vertical plane; an arcuate sector member secured to the forward extremity of the frame beam and extending upwardly and rearwardly between the legs of said draft bar, said sector member being provided with spaced stop receiving openings; and a stop member adapted to be positioned in any desired one of said openings, said stop member projecting oppositely outward from both sides of said sector member so as to engage the legs of said draft bar to stop the downward movement of the forward extremity of said frame beam thereby and consequently limiting the resulting upward movement of said plow to a preset arc so as to control the width of the ditch dug by said plow.

References Cited in the file of this patent

UNITED STATES PATENTS

| Number | Name | Date |
|---|---|---|
| 717,846 | Hardin | Jan. 6, 1903 |
| 1,603,019 | Boda | Oct. 12, 1926 |
| 1,941,400 | Johnson | Dec. 26, 1933 |
| 2,195,631 | Post | Apr. 2, 1940 |
| 2,417,624 | Altgelt | Mar. 8, 1947 |
| 2,544,815 | Weaver | Mar. 13, 1951 |
| 2,564,034 | Seeger | Aug. 14, 1951 |
| 2,625,089 | Pursche | Jan. 13, 1953 |